(12) United States Patent
Xiao

(10) Patent No.: US 11,899,455 B2
(45) Date of Patent: *Feb. 13, 2024

(54) SYSTEMS AND METHODS FOR VEHICLE SMART SEATS

(71) Applicant: Pony AI Inc., Grand Cayman (KY)

(72) Inventor: Sinan Xiao, Mountain View, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,296

(22) Filed: Jun. 6, 2022

(65) Prior Publication Data

US 2022/0308582 A1 Sep. 29, 2022

Related U.S. Application Data

(63) Continuation of application No. 16/523,933, filed on Jul. 26, 2019, now Pat. No. 11,353,871.

(60) Provisional application No. 62/712,069, filed on Jul. 30, 2018.

(51) Int. Cl.
| | |
|---|---|
| *G05D 1/00* | (2006.01) |
| *B60N 2/00* | (2006.01) |
| *B60W 30/18* | (2012.01) |
| *B60W 10/18* | (2012.01) |
| *B60W 10/06* | (2006.01) |
| *G06N 20/00* | (2019.01) |
| *B60W 40/08* | (2012.01) |

(52) U.S. Cl.
CPC ........... *G05D 1/0088* (2013.01); *B60N 2/002* (2013.01); *B60W 10/06* (2013.01); *B60W 10/18* (2013.01); *B60W 30/18* (2013.01); *B60W 40/08* (2013.01); *G06N 20/00* (2019.01); *B60W 2040/0881* (2013.01); *B60W 2400/00* (2013.01); *B60W 2710/06* (2013.01); *B60W 2710/18* (2013.01); *G05D 2201/0213* (2013.01)

(58) Field of Classification Search
CPC .................................................... G05D 1/0088
See application file for complete search history.

(56) References Cited

U.S. PATENT DOCUMENTS

| | | | |
|---|---|---|---|
| 9,463,805 B2 | 10/2016 | Kirsch et al. | |
| 9,751,534 B2 | 9/2017 | Fung et al. | |
| 9,832,306 B2 | 11/2017 | Kadous | |
| 9,988,008 B2 | 6/2018 | Thieberger et al. | |
| 10,214,118 B1 | 2/2019 | Jain et al. | |
| 10,493,957 B2 * | 12/2019 | Tarte | G05D 1/0055 |
| 10,710,594 B2 | 7/2020 | Zhao et al. | |
| 10,841,563 B1 | 11/2020 | Dutta | |
| 11,284,051 B2 * | 3/2022 | Song | H04N 9/3179 |
| 11,353,871 B2 * | 6/2022 | Xiao | B60W 30/18 |
| 2016/0264021 A1 | 9/2016 | Gillett | |
| 2018/0050664 A1 | 2/2018 | Tarte | |

(Continued)

*Primary Examiner* — Michael A Berns

(57) ABSTRACT

A method comprises obtaining smart seat sensor data, the smart seat sensor data being detected by a tactile-sensitive surface material of a seat of an autonomous vehicle in response to a user interacting with the tactile-sensitive surface material. Other sensor data is obtained from one or more other sensors disposed within the autonomous vehicle. The smart seat sensor data and the other sensor data are integrated. A behavior of the user is estimated based on the integrated data, and the autonomous vehicle is controlled based on the estimated behavior of the user.

20 Claims, 13 Drawing Sheets

(56) References Cited

U.S. PATENT DOCUMENTS

2019/0391581 A1 12/2019 Vardaro et al.
2020/0033858 A1 1/2020 Xiao

* cited by examiner

SYSTEMS AND METHODS FOR VEHICLE SMART SEATS

CROSS REFERENCE TO RELATED APPLICATIONS

This application is a continuation application of U.S. patent application Ser. No. 16/523,933, filed Jul. 26, 2019, claims the benefit of and priority to U.S. Provisional Patent Application No. 62/712,069 filed on Jul. 30, 2018, which is hereby incorporated by reference in its entirety.

TECHNICAL FIELD

This disclosure pertains to autonomous vehicles. More specifically, this disclosure pertains to systems and methods related to autonomous vehicle smart seats.

BACKGROUND

Under some approaches, cameras may be used to capture images of users (e.g., passengers, safety drivers) within an autonomous vehicle. However, such cameras may breach user privacy (e.g., by capturing actual images of the user), and require large amounts of computing resources (e.g., to store and/or process image data).

SUMMARY

Various embodiments of the present disclosure include systems, methods, and non-transitory computer readable media configured to obtain smart seat sensor data, the smart seat sensor data being detected by a tactile-sensitive surface material of a seat of an autonomous vehicle in response to a user interacting with the tactile-sensitive surface material. Other sensor data is obtained from one or more other sensors disposed within the autonomous vehicle. The smart seat sensor data and the other sensor data are integrated. A behavior of the user is estimated based on the integrated data, and the autonomous vehicle is controlled based on the estimated behavior of the user.

In some embodiments, the user interacting with the tactile-sensitive surface material comprises a passenger sitting on the seat of the autonomous vehicle.

In some embodiments, the other sensor data comprises any of weight data and temperature data.

In some embodiments, the behavior of the user is estimated using a machine learning model.

In some embodiments, the estimated behavior comprises any of the user entering the autonomous vehicle, the user exiting the autonomous vehicle, the user damaging the autonomous vehicle, and the user leaving an object in the autonomous vehicle subsequent to the user exiting the autonomous vehicle.

In some embodiments, the one or more other sensors are disposed within any of a headrest portion of the seat of the autonomous vehicle, a backrest portion of the seat, a sitting portion of the seat of the autonomous vehicle, a floor portion of the autonomous vehicle, a roof portion of the autonomous vehicle, and a door portion of the autonomous vehicle. In related embodiments, the integrating the smart seat sensor data and the other sensor data includes creating a new dataset in accordance with the machine learning model.

In some embodiments, the controlling the autonomous vehicle comprises any allowing the autonomous vehicle to perform one or more autonomous vehicle actions, and preventing the autonomous vehicle from performing one or more autonomous vehicle actions. In related embodiments, the one or more autonomous vehicle action include any of accelerating, braking, turning an engine of the autonomous vehicle off, and turning the engine of the autonomous vehicle on.

Various embodiments of the present disclosure include systems, methods, and non-transitory computer readable media configured to obtain autonomous vehicle sensor data of an autonomous vehicle. One or more autonomous vehicle actions of the autonomous vehicle are predicted based on the autonomous vehicle sensor data. Interactive content is identified from a library of interactive content. The interactive content is adjusted based on the predicted one or more autonomous vehicle actions, and the adjusted interactive content is presented within the autonomous vehicle.

In some embodiments, the one or more autonomous vehicle actions include any of steering, accelerating, and braking.

In some embodiments, the adjusting the interactive content comprises adjusting a playback speed of the interactive content.

In some embodiments, the adjusting the interactive content comprises rotating at least a portion of the interactive content.

In some embodiments, the presenting the adjusted interactive content within the autonomous vehicle comprises projecting the interactive content on an interior surface of the autonomous vehicle.

In some embodiments, the surface comprises a curved interior surface. In related embodiments, the curved interior surface comprises a window of the autonomous vehicle. In related embodiments, the interactive content is projected from a projector mounted within the autonomous vehicle.

In some embodiments, the systems, methods, and non-transitory computer readable media further configured to estimating a behavior of a user based on smart seat sensor data detected by a tactile-sensitive surface material of a seat of the autonomous vehicle; and adjusting the interactive content in response to the estimated user behavior.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
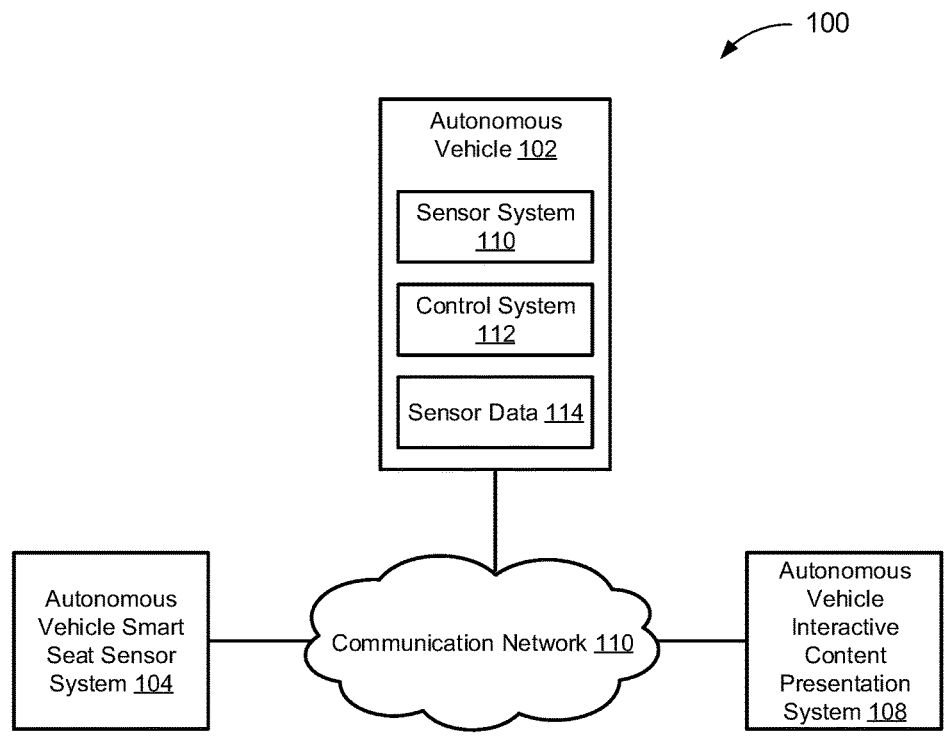
FIG. 1 depicts a diagram of an example system for detecting user behavior within an autonomous vehicle, and presenting interactive content within an autonomous vehicle according to some embodiments.

A claimed solution rooted in computer technology overcomes problems specifically arising in the realm of computer technology. In various embodiments, a system is configured to detect and/or obtain smart seat sensor data. The smart seat sensor data may be detected by a tactile-sensitive surface material of a seat of an autonomous vehicle. For example, the tactile-sensitive surface material may comprise fabric with electrical properties woven therein. The smart seat sensor data may be detected in response to a user (e.g., passenger, safety driver) interacting with the tactile-sensitive surface material (e.g., sitting on the tactile-sensitive surface material). The system may detect and/or obtain other sensor data from one or more other sensors (e.g., weight sensors, temperature sensors) disposed within the autonomous vehicle. The one or more other sensors may be disposed in various portion of the autonomous vehicle (e.g., seat, floor, door, roof). The system may integrate the smart seat sensor data and the other sensor data. This may include, for example, normalizing the data and/or preparing the data for use by one or more machine learning models. Using the integrated data, the system may estimate a behavior of the user. This may, for example, allow the system to determine behaviors of the user without requiring cameras, large amounts of computing resources, and/or breaching user privacy. In some embodiments, a machine learning model may be used to estimate user behavior, such as user being properly seated on the seat of the autonomous vehicle, a user exiting the autonomous vehicle, a user damaging the autonomous vehicle, a user being asleep in the autonomous vehicle, and/or the like. The autonomous vehicle may also be controlled based on the estimated behavior of the user. For example, the autonomous vehicle may be prevented from moving from a stop unless the user is seated.

In various embodiments, a system is configured to obtain autonomous vehicle sensor data of an autonomous vehicle. For example, the system may control various sensors (e.g., cameras, radar, Lidar) of the autonomous vehicle to detect sensor data. The system may predict one or more autonomous vehicle actions of the autonomous vehicle based on the autonomous vehicle sensor data (e.g., predicting a steering action based on sensor data indicating an upcoming turn). The system may identify interactive content from a library of interactive content. The interactive content may be identified in response to user input, based on exterior conditions (e.g., terrain, time of day), and/or the like. The interactive content may include virtual reality content, augmented reality content, projected content, and/or the like. Interactive content may include three-dimensional (3D) and/or two-dimensional (2D) images, video, audio, haptics, and/or the like. The system may adjust the interactive content based on current autonomous vehicle action, predicted autonomous vehicle actions, and/or estimated behavior of a user. The adjusted interactive content may be presented within the autonomous vehicle. For example, the interactive content may be rotated to correspond with a steering action and/or an upcoming steering action, and the rotated interactive content may be presented on an interior surface of the autonomous vehicle (e.g., a window). This may, for example, provide the user with a more immersive and/or comfortable experience.

Figure 7:
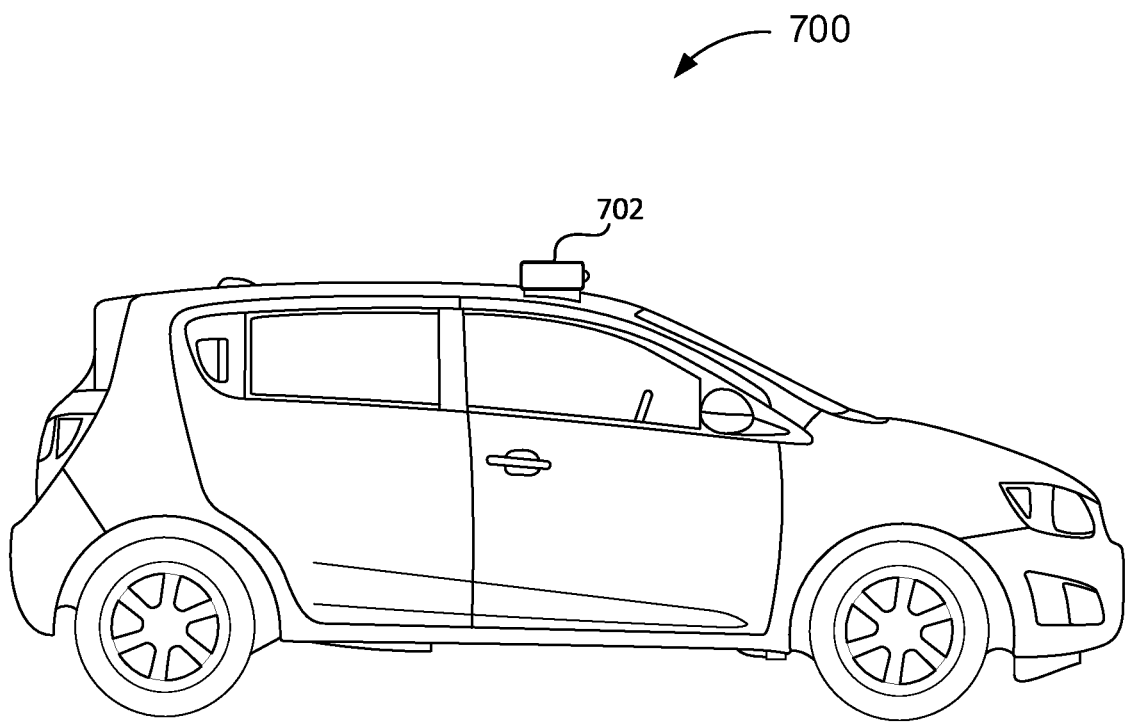
FIG. 7 depicts a diagram of an example of an autonomous vehicle according to some embodiments.

FIG. 1 depicts a diagram 100 of an example system for detecting user behavior within an autonomous vehicle, and presenting interactive content within an autonomous vehicle according to some embodiments. In the example of FIG. 1, the system includes an autonomous vehicle 102, an autonomous vehicle smart seat system (or, simply, "smart seat system") 104, an autonomous vehicle interactive content presentation system (or, simply, "interactive content presentation system") 106, and a communication network 108. In various embodiments, the systems 104-106 and the communication network 110 are implemented as part of the autonomous vehicle 102. The autonomous vehicle 102 may be capable of sensing its environment and/or navigating with a limited human input or without human input. The "vehicle" discussed in this paper typically includes a vehicle that travels on the ground (e.g., car, truck, bus), but may also include a vehicle that travels in the air (e.g., drones, helicopter, airplanes, and so on), travels on water (e.g., a boat), and/or the like. The "vehicle" discussed in this paper may accommodate one or more users (e.g., passengers, safety drivers) therein. An example of an autonomous vehicle 102 is depicted in FIG. 7.

In the example of FIG. 1, the autonomous vehicle 102 includes an autonomous vehicle sensor system 110 and an autonomous vehicle control system 112. The autonomous vehicle sensor system 110 may detect autonomous vehicle sensor data 114. In some embodiments, the autonomous vehicle sensor system 110 may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the autonomous vehicle. An example rotatable laser scanning system 702 in shown in FIG. 7.

In some embodiments, the autonomous vehicle sensor system 110 may include cameras mounted on the autonomous vehicle to capture images (or, image data) of regions surrounding the autonomous vehicle. For example, the cameras may capture images in front of the autonomous vehicle, on the sides of the autonomous vehicle, above the autonomous vehicle, below the autonomous vehicle, and/or behind the autonomous vehicle.

The autonomous vehicle control system 112 may function to process autonomous vehicle sensor data 114 to sense an environment surrounding an autonomous vehicle and/or cause an autonomous vehicle to perform and/or predict one or more autonomous vehicle control actions (or, simply, "control actions" or "actions"). For example, the autonomous vehicle control system 112 may analyze sensor data 114 to identify objects (e.g., traffic signals, road signs, other vehicles, pedestrians, and obstacles) in one or more regions surrounding the autonomous vehicle. As used herein, control actions may include controlling braking, acceleration, and/or steering without real time human input. Additionally, control actions may include adjusting components within the autonomous vehicle 102 (e.g., rotating seats). Furthermore, as used herein, "real time human input" is intended to represent a human input that is needed to concurrently control wheel movement of a non-self-driving vehicle, such as gear shifting, steering control, braking pedal control, acceleration pedal control, crutch pedal control, and so on. The autonomous vehicle control system 112 may be implemented as a central computing system of an autonomous vehicle.

The smart seat system 104 may function to detect interactions within an autonomous vehicle without requiring a camera and/or other imaging devices. Interactions may include placing an object (e.g., a box) on a seat of the autonomous vehicle, a user sitting on a seat, opening/closing a door, damaging a portion of the autonomous vehicle (e.g., a seat), and/or the like. In some embodiments, the smart seat system 104 includes and/or cooperates with tactile-sensitive surface material within an autonomous vehicle to obtain smart seat sensor data. For example, the tactile-sensitive surface material may comprise fabric embedded with electrical properties (e.g., resistive properties, conductive properties). The smart seat data may be detected in response to user interaction with the tactile-sensitive surface material. The tactile-sensitive surface material may disposed on one or more surfaces of the autonomous vehicle, such as seats (e.g., tactile-sensitive surface material may comprise the outer surface of the seat), doors, floor, ceiling, and/or the like.

In some embodiments, the smart seat system 104 may include and/or cooperate with one or more other sensors in addition to the tactile-sensitive surface material. For example, the other sensors may include weight sensors, temperature sensors, pressure sensors, and/or the like. The other sensors may disposed within one or more interior portions of the autonomous vehicle (e.g., seats, floor, ceiling, doors) to detect other sensor data. For example, the other sensors may detect temperatures and/or changes in temperatures within the autonomous vehicle (e.g., an ambient temperature of the autonomous vehicle) and/or objects and/or users within the autonomous vehicle. In some embodiments, the smart seat system 104 may detect interactions within the autonomous vehicle based on the smart seat data and the other sensor data.

In some embodiments, the smart seat system 104 may estimate behaviors of users and/or objects within an autonomous vehicle. The smart seat system 104 may estimate behaviors based on the smart seat data and/or the other sensor data. In some embodiments, the smart seat system 104 may utilize a machine learning model (e.g., a random forest model) to estimate behaviors within an autonomous vehicle. For example, the smart seat system 104 may integrate the smart seat system data and the other sensor data according to a machine learning model, and the machine learning model may output one or more estimated behaviors. This may allow, for example, actions to be taken based on estimated behavior instead of actual behavior (e.g., as captured by a camera or other device). This may, for example, reduce the need for extensive computing resources (e.g., storage for image data, and image processing equipment), as may help maintain user privacy.

The interactive content presentation system 106 may function to present interactive content within an autonomous vehicle. Interactive content may include virtual reality content, augmented reality content, and/or the like. In some embodiments, functionality of the interactive content presentation system 106 may be performed by one or more projector devices and/or one or more other computing devices. For example, a projector may be mounted inside the autonomous vehicle, and project the interactive content onto one or more interior surfaces of the autonomous vehicle (e.g., windows). In some embodiments, the interior surfaces of the autonomous vehicle may be curved in order to facilitate presentation of the interactive content. In some embodiments, goggles and/or glasses may or more may not be required to view the interactive content. For example, glasses may be used to view interactive content projected into an interior surface of the autonomous vehicle. In some embodiments, the interactive content presentation system 106 may function to present interactive content without requiring a projector. For example, the material of the interior surface (e.g., window) may comprise an interactive content display device capable of displaying the interactive content.

In some embodiments, the interactive content presentation system 106 may function to adjust a presentation of interactive content. For example, the interactive content presentation system 106 may rotate a presentation of interactive content based on one or more actual or predicted autonomous vehicle actions, and/or estimated behaviors of a user. For example, the interactive content may be rotated to correspond to a steering action of the autonomous vehicle.

The communications network 108 may represent one or more computer networks (e.g., LAN, WAN, or the like) or other transmission mediums. The communication network 108 may provide communication between the autonomous vehicle 102, systems 104-106, and/or other systems/engine/datastores described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

Figure 2:
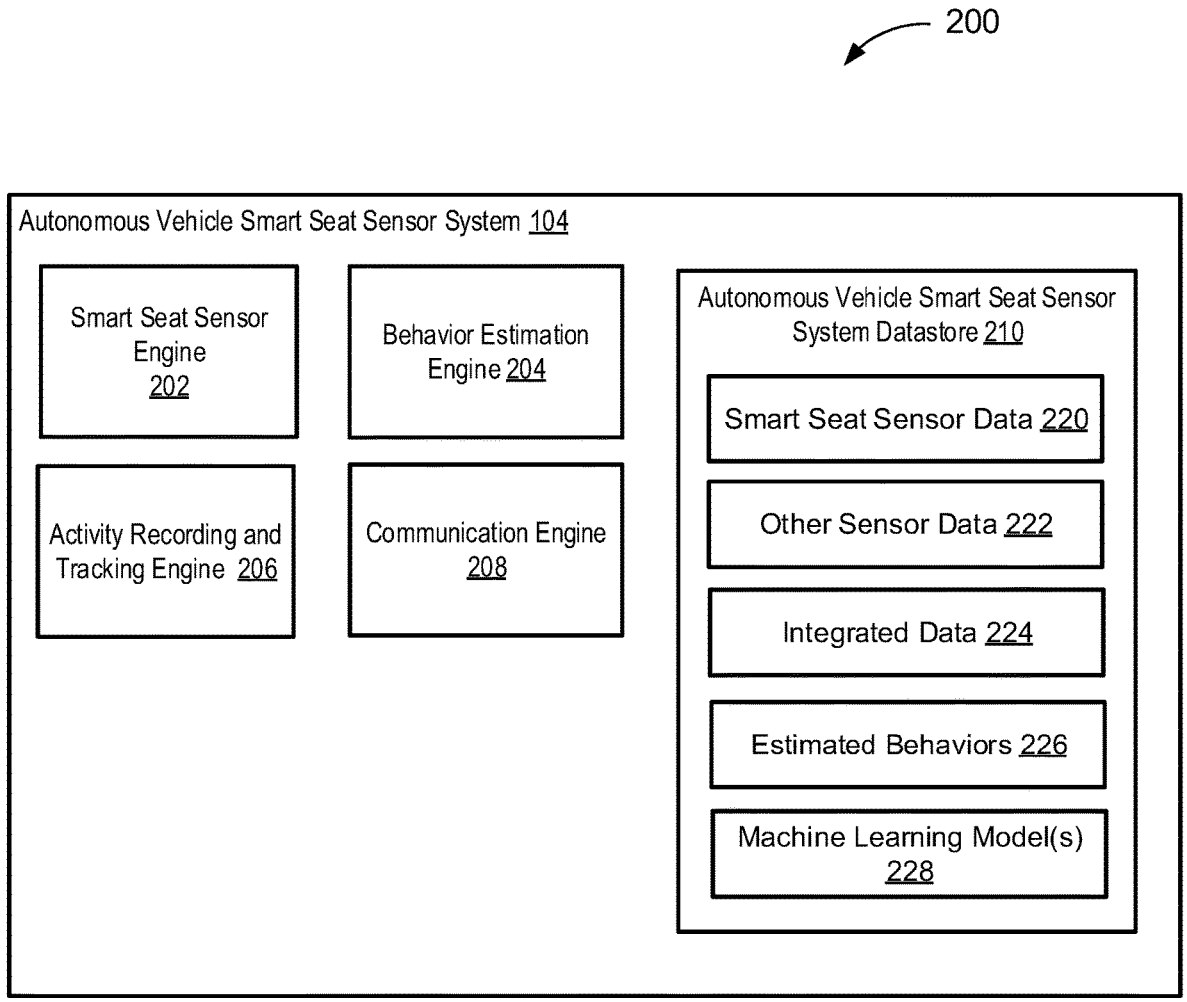
FIG. 2 depicts a diagram of an example of a smart seat system according to some embodiments.

FIG. 2 depicts a diagram 200 of an example of a smart seat system 104 according to some embodiments. In the example of FIG. 2, the smart seat system 104 includes a smart seat sensor engine 202, a behavior estimation engine 204, an activity recording and tracking engine 206, a communication engine 208, and an autonomous vehicle smart seat system datastore 210.

Figure 9:
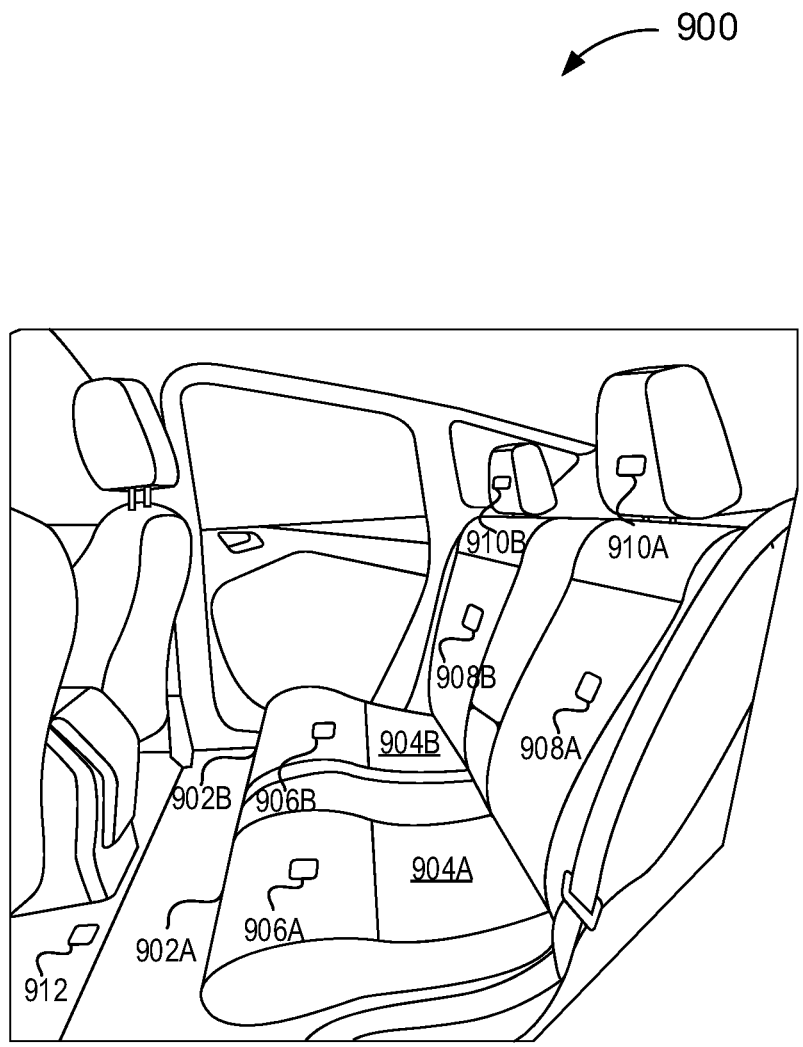
FIG. 9 depicts a diagram of a seating compartment of an autonomous vehicle configured to detect user behavior within the autonomous vehicle.
Figure 10:
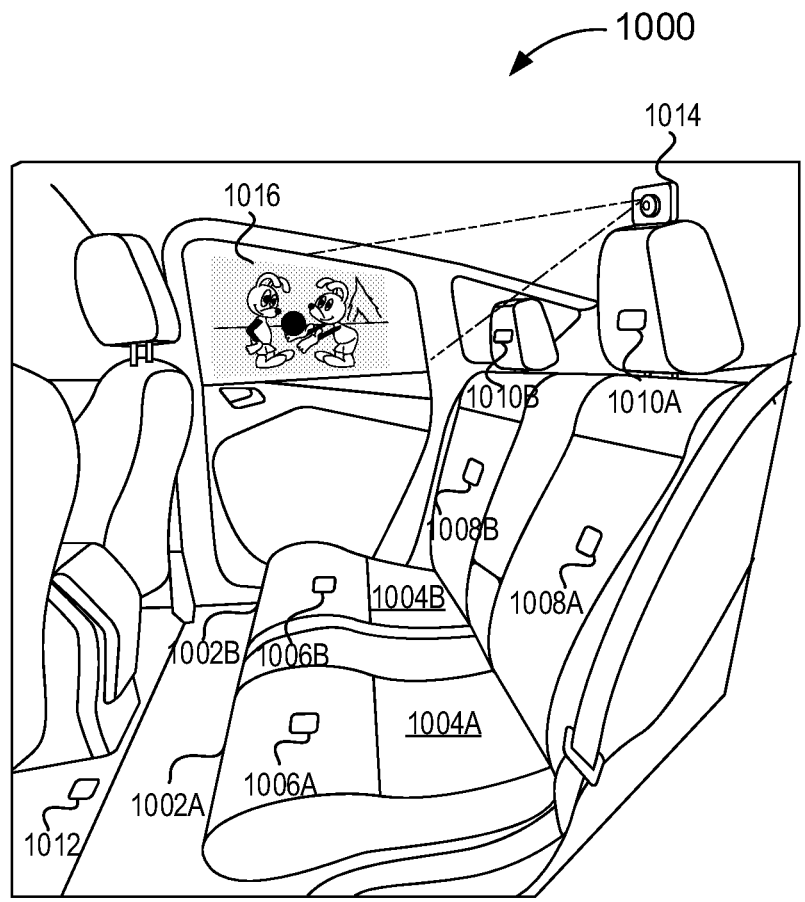
FIG. 10 depicts a diagram of a seating compartment of an autonomous vehicle configured to detect user behavior within the autonomous vehicle and present interactive content on an interior surface of the autonomous vehicle.

The smart seat sensor engine 204 may function to obtain and/or detect sensor data. The sensor data may include smart seat sensor data 220 and other sensor data 222. Smart seat sensor data 220 may be detected by tactile-sensitive surface material, and the other sensor data may be detected by one or more other sensors disposed within an autonomous vehicle. Example configurations are shown in FIGS. 9 and 10.

The behavior estimation engine 206 may function to integrate smart seat sensor data 220 and other sensor data 222. For example, the behavior estimation engine may normalize the data 220-222, create a new dataset, and/or the like. The behavior estimation engine 206 may integrate the data based on one more machine learning models 228. For example, the data 220-222 may be integrated according to parameters and/or other attributes of a machine learning model 228 configured to estimate behavior of a user.

In some embodiments, the behavior estimation engine 206 may function to estimate behavior of a user. For example, the behavior of the user may be estimated using a machine learning model 228. For example, the machine learning model 228 may use the integrated data 224 to estimate user behaviors 226. Estimating behaviors may require less computing resources than capturing images of user behaviors, and may help maintain user privacy.

The activity recording and tracking engine 206 may function to store, record, and/or track smart seat sensor data 220, other sensor data 220, integrated data 224, and machine learning models 228. In some embodiments, the activity recording and tracking engine 206 may track behaviors 226 and notify the users and/or other entities of particular behaviors. For example, if a user leaves an object (e.g., a wallet) on the seat of the autonomous vehicle and exits the autonomous vehicle, the activity recording and tracking engine 206 may send a notification to a device (e.g., mobile device) associated with the user. Similarly, if damage to the autonomous vehicle is estimated to have been caused to the autonomous vehicle by the user, then a device of an owner of the autonomous vehicle may be notified.

The communication engine 208 may function to send requests, transmit and, receive communications, and/or otherwise provide communication with one or a plurality of systems. In some embodiments, the communication engine 208 functions to encrypt and decrypt communications. The communication engine 208 may function to send requests to and receive data from one or more systems through a network or a portion of a network. Depending upon implementation-specific considerations, the communication engine 208 may send requests and receive data through a connection, all or a portion of which may be a wireless connection. The communication engine 208 may request and receive messages, and/or other communications from associated systems. Communications may be stored at least temporarily (e.g., cached and/or persistently) in the datastore 210.

Figure 3:
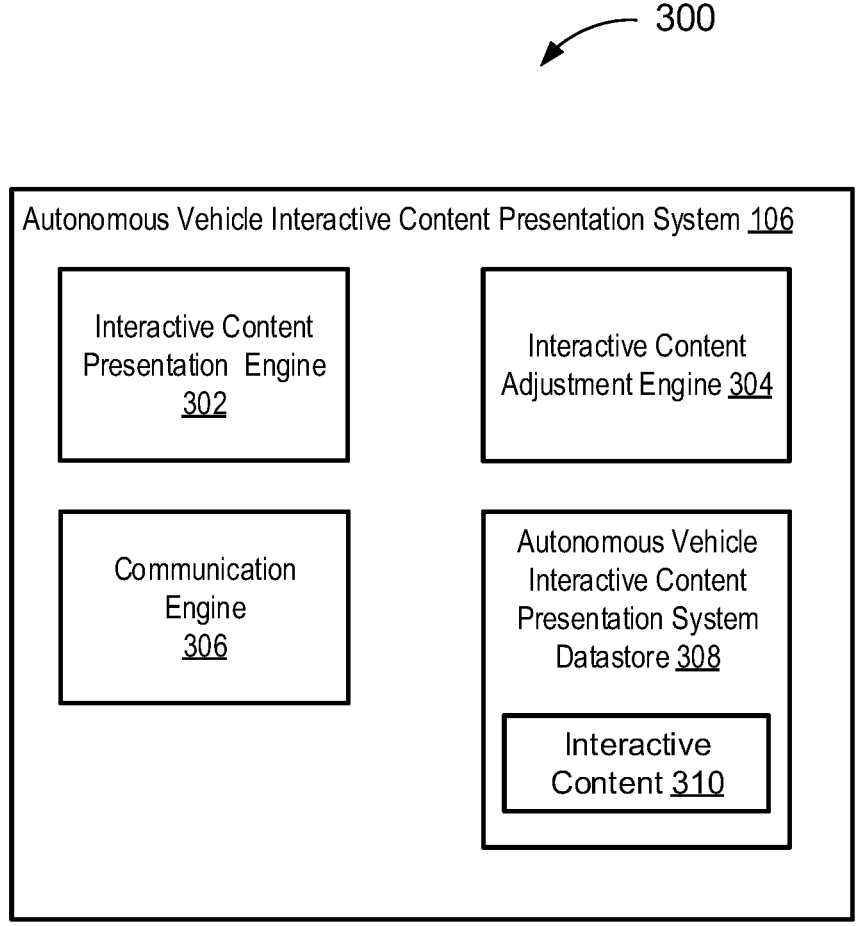
FIG. 3 depicts a diagram of an example of an autonomous vehicle interactive content presentation system according to some embodiments.

FIG. 3 depicts a diagram 300 of an example of an autonomous vehicle interactive content presentation system 106 according to some embodiments. In the example of FIG. 3, the interactive content presentation system 106 includes an interactive content presentation engine 302, an interactive content adjustment engine 304, a communication engine 306, and an interactive content presentation system datastore 308.

The interactive content presentation engine 302 may function to present interactive content 310 within an autonomous vehicle. In some embodiments, the interactive content presentation engine 302 may project interactive content 310 on to a surface of the autonomous vehicle (e.g., a window). For example, an interactive content projector may project multi-layered images of the interactive content 310 (or interactive content 310 converted into multi-layered images) on to a curved surface (e.g., a window of the autonomous vehicle). In some embodiments, the interactive content 310 may be presented by the surface itself, as opposed to being projected thereon. For example, the window may comprise an interactive content display device capable of displaying multi-layered images that present and/or similar virtual reality, augmented reality, and/or the like. The interactive content presentation engine 302 may also include speakers and/or other output devices (e.g., haptic output devices) or outputting audio, haptics, and/or the like, in addition to images.

The interactive content adjustment engine 304 may function to adjust interactive content. The interactive content adjustment engine 304 may adjust interactive content in real-time (e.g., as it is being played back), and/or prior to playback. In some embodiments, the interactive content adjustment engine 304 may adjust interactive content 310 based on estimated user behaviors, predicted autonomous vehicle actions, and/or the like. For example, the interactive content adjustment engine 304 adjust a playback speed of interactive content and/or may rotate a currently presented interactive content in anticipation of a predicted steering action the autonomous vehicle.

The communication engine 306 may function to send requests, transmit and, receive communications, and/or otherwise provide communication with one or a plurality of systems. In some embodiments, the communication engine 306 functions to encrypt and decrypt communications. The communication engine 306 may function to send requests to and receive data from one or more systems through a network or a portion of a network. Depending upon implementation-specific considerations, the communication engine 306 may send requests and receive data through a connection, all or a portion of which may be a wireless connection. The communication engine 306 may request and receive messages, and/or other communications from associated systems. Communications may be stored at least temporarily (e.g., cached and/or persistently) in the datastore 308.

Figure 4:
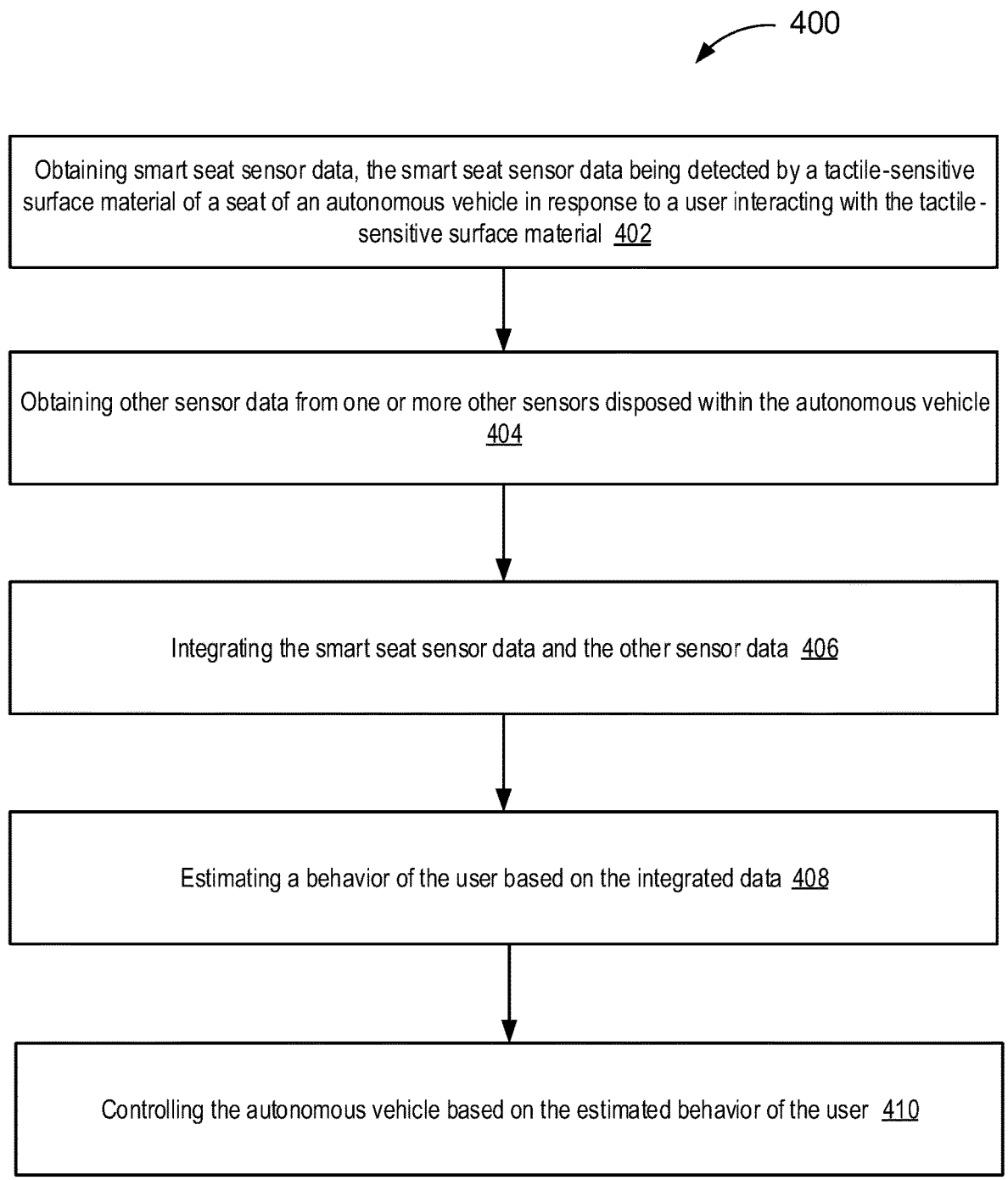
FIG. 4 depicts a flowchart of an example of a method of detecting user behavior within an autonomous vehicle according to some embodiments.

FIG. 4 depicts a flowchart 400 of an example of a method of detecting user behavior within an autonomous vehicle according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, a smart seat system (e.g., smart seat system 104) obtains smart seat sensor data (e.g., smart seat sensor data 220). The smart seat sensor data may be detected by a tactile-sensitive surface material (e.g., tactile-sensitive surface material 904) of a seat (e.g., seat 902) of an autonomous vehicle (e.g., autonomous vehicle 102) in response to a user (e.g., passenger, safety driver) interacting with the tactile-sensitive surface material. For example, a user interacting with the tactile-sensitive surface material may include a passenger sitting on the seat of the autonomous vehicle.

In some embodiments, a smart seat sensor engine (e.g., smart seat sensor engine 202) obtains and detects the smart seat sensor data. The smart seat sensor data may be recorded. For example, an activity recording and tracking engine (e.g., activity recording and tracking engine 208) may record the smart seat sensor data in a datastore (e.g., autonomous vehicle smart seat system datastore 210).

In step 404, the smart seat system obtains other sensor data (e.g., other sensor data 222) from one or more other sensors (e.g., sensor 912) disposed within the autonomous vehicle. For example, the other sensor data may include weight data, temperature data, and/or the like. In some embodiments, the one or more other sensors are disposed within a headrest portion of the seat of the autonomous vehicle, a backrest portion of the seat, a sitting portion of the seat of the autonomous vehicle, a floor portion of the autonomous vehicle, a roof portion of the autonomous vehicle, and a door portion of the autonomous vehicle. In some embodiments, the smart seat sensor engine obtains and/or detects the other sensor data. The other sensor data may be recorded. For example, the activity recording and tracking engine may record the other sensor data in the datastore.

In step 406, the smart seat system integrates the smart seat sensor data and the other sensor data. In some embodiments, the smart seat sensor data and the other sensor data may be integrated to create a new dataset in accordance with the machine learning model. For example, the machine learning model may require the input data to conform to a particular format (e.g., a particular normalized format).

In some embodiments, a behavior estimation engine (e.g., behavior estimation engine 204) integrates the smart seat sensor data and the other sensor data. The integrated data (e.g., integrated data 224) may be recorded. For example, the activity recording and tracking engine may record the integrated data in the datastore.

In step 408, the smart seat system estimates a behavior (e.g., estimated behaviors 226) of a user based on the integrated data. For example, the behavior of the user may be estimated using a machine learning model (e.g., machine learning model 228). In some embodiments, the behavior estimation engine estimates the behavior of the user. The behavior data may be recorded. For example, the activity recording and tracking engine may record the behavior data in the datastore. In some embodiments, behaviors may include a passenger buckling a seat belt, leaving an object on the seat of the autonomous vehicle, exiting the autonomous vehicle, the damaging the autonomous vehicle (e.g., tearing the tactile-sensitive surface material).

In step 410, an autonomous vehicle control system (e.g., autonomous vehicle control system 112) control the autonomous vehicle based on the estimated behavior of the user. In some embodiments, a communication engine (e.g., communication engine 208) may provide the estimate behavior to the autonomous vehicle control system, and autonomous vehicle control system may allow/cause the autonomous vehicle to perform one or more autonomous vehicle actions, and/or prevent the autonomous vehicle from performing one or more autonomous vehicle actions. For example, autonomous vehicle actions may include accelerating, braking, turning an engine off, and turning the engine on, and/or the like.

Figure 5:
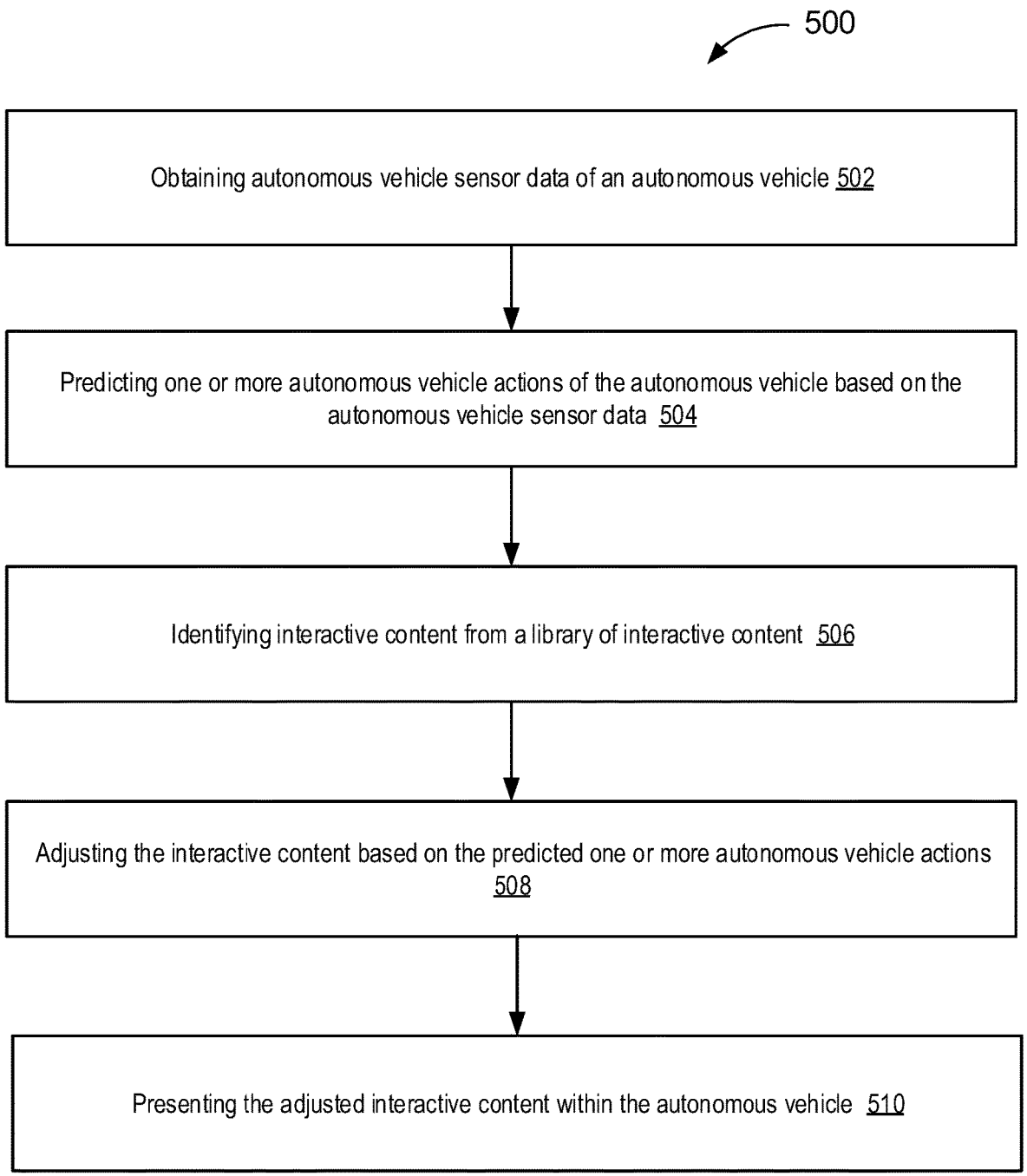
FIG. 5 depicts a flowchart of an example of a method of presenting interactive content within an autonomous vehicle according to some embodiments.

FIG. 5 depicts a flowchart 500 of an example of a method of presenting interactive content within an autonomous vehicle according to some embodiments.

In step 502, an interactive content presentation system (e.g., autonomous vehicle interactive content presentation system 106) obtains autonomous vehicle sensor data (e.g., autonomous vehicle sensor data 114) of an autonomous vehicle (e.g., autonomous vehicle 102). For example, the autonomous vehicle sensor data may be detected by sensor system mounts on the autonomous vehicle (e.g., sensor system 702).

In step 504, an autonomous vehicle control system (e.g., autonomous vehicle control system 112) predicts one or more autonomous vehicle actions of the autonomous vehicle based on the autonomous vehicle sensor data. For example, autonomous vehicle actions include steering, accelerating, and/or braking.

In step 506, the interactive content presentation system identifies interactive content (e.g., interactive content 310) from a library of interactive content (e.g., stored in datastore 308). In some embodiments, an interactive content presentation engine (e.g., interactive content presentation engine 302) identifies the interactive content.

In step 508, the interactive content presentation system adjust the interactive content based on the predicted one or more autonomous vehicle actions. For example, a playback speed of the interactive content be adjusted, the interactive content may be rotated, and/or the like. In some embodiments, an interactive content adjustment engine (e.g., interactive content adjustment engine 304) adjusts the interactive content. In some embodiments, the interactive content presentation system adjusts the interactive content based on one or more estimated behaviors of a user instead of, or in addition to, the predicted one or more autonomous vehicle actions.

In step 510, the interactive content presentation system presents the adjusted interactive content within the autonomous vehicle. For example, the interactive content may be projected (e.g., by an HD laser projector mounted in the autonomous vehicle) on an interior surface (e.g., a window) of the autonomous vehicle. The surface may be curved (e.g., to facilitate presentation of the interactive content). In some embodiments, the interactive content presentation engine presents the adjusted interactive content.

Figure 6:
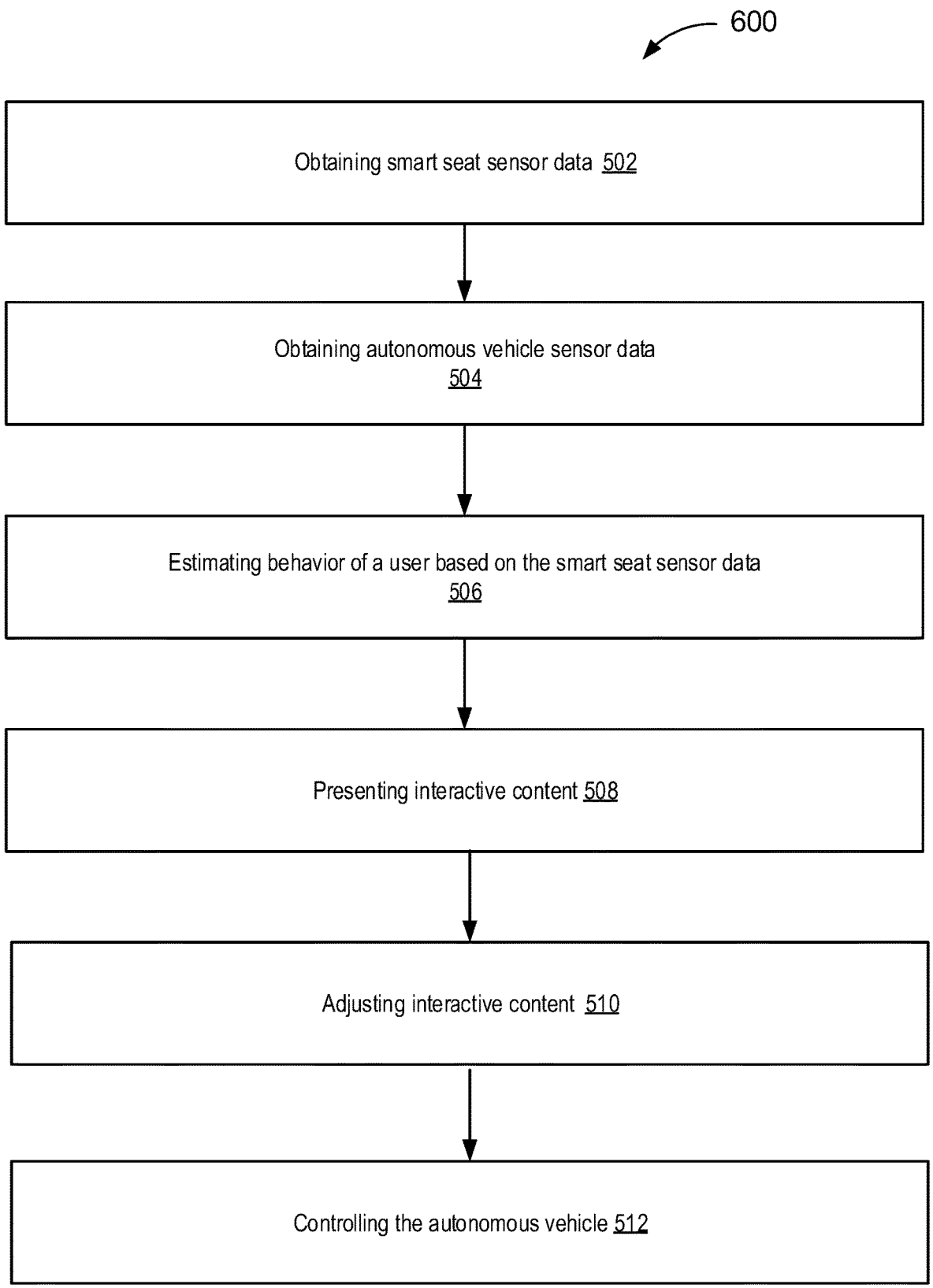
FIG. 6 depicts a flowchart of an example of a method of detecting user behavior within an autonomous vehicle and presenting interactive content within an autonomous vehicle according to some embodiments.

FIG. 6 depicts a flowchart 600 of an example of a method of detecting user behavior within an autonomous vehicle and presenting interactive content within an autonomous vehicle according to some embodiments.

In step 602, a smart seat system (e.g., smart seat system 104) obtains smart seat sensor data (e.g., smart seat sensor data 220). The smart seat sensor data may be detected by a tactile-sensitive surface material (e.g., tactile-sensitive surface material 904) of a seat (e.g., seat 902) of an autonomous vehicle (e.g., autonomous vehicle 102) in response to a user (e.g., passenger, safety driver) interacting with the tactile-sensitive surface material. For example, a user interacting with the tactile-sensitive surface material may include a passenger sitting on the seat of the autonomous vehicle.

In step 604, an interactive content presentation system (e.g., autonomous vehicle interactive content presentation system 106) obtains autonomous vehicle sensor data (e.g., autonomous vehicle sensor data 114) of the autonomous vehicle.

In step 606, the smart seat system estimates a behavior (e.g., estimated behaviors 226) of a user based on the integrated data. For example, the behavior of the user may be estimated using a machine learning model (e.g., machine learning model 228). In some embodiments, the behavior estimation engine estimates the behavior of the user. The behavior data may be recorded. For example, the activity recording and tracking engine may record the behavior data in the datastore. In some embodiments, behaviors may include a passenger buckling a seat belt, leaving an object on the seat of the autonomous vehicle, exiting the autonomous vehicle, the damaging the autonomous vehicle (e.g., tearing the tactile-sensitive surface material).

In step 608, the interactive content presentation system presents interactive content (e.g., interactive content 310)

within the autonomous vehicle. For example, the interactive content may be projected (e.g., by an HD laser projector mounted in the autonomous vehicle) on an interior surface (e.g., a window) of the autonomous vehicle. The surface may be curved (e.g., to facilitate presentation of the interactive content). In some embodiments, the interactive content presentation engine presents the adjusted interactive content.

In step 610, the interactive content presentation system adjusts the interactive content. For example, the interactive content may be adjusted based on the estimated user behaviors. For example, the estimated user behavior may be sleeping (e.g., based on a particular type of movement and/or lack of movement detected by the tactile-sensitive surface material). Thus, for example, the interactive content playback may be paused/terminated, a brightness of the interactive content may be reduced, and/or the like. In some embodiments, an interactive content adjustment engine (e.g., interactive content adjustment engine 304) adjusts the interactive content. In some embodiments, the interactive content presentation system adjusts the interactive content based on one or more estimated behaviors of a user instead of, or in addition to, the predicted one or more autonomous vehicle actions.

In step 612, an autonomous vehicle control system (e.g., autonomous vehicle control system 112) controls the autonomous vehicle. In some embodiments, the autonomous vehicle may be controlled based estimated user behavior and/or predicted autonomous vehicle actions. For example, the seat of the autonomous vehicle may be adjusted (e.g., rotated) according to a predicted and/or current steering action. Accordingly, when the autonomous vehicle turns, the interactive content may be rotated to correspond to the turn, and the seat of the passenger may be rotated to correspond to the turn and/or rotated interactive content. This may, for example, reduce motions sickness and/or improve an immersive experience of the user.

In some embodiments, a communication engine (e.g., communication engine 208) may provide the estimate behavior to the autonomous vehicle control system, and autonomous vehicle control system may allow/cause the autonomous vehicle to perform one or more autonomous vehicle actions, and/or prevent the autonomous vehicle from performing one or more autonomous vehicle actions. For example, autonomous vehicle actions may include accelerating, braking, turning an engine off, and turning the engine on, and/or the like.

Figure 8A:
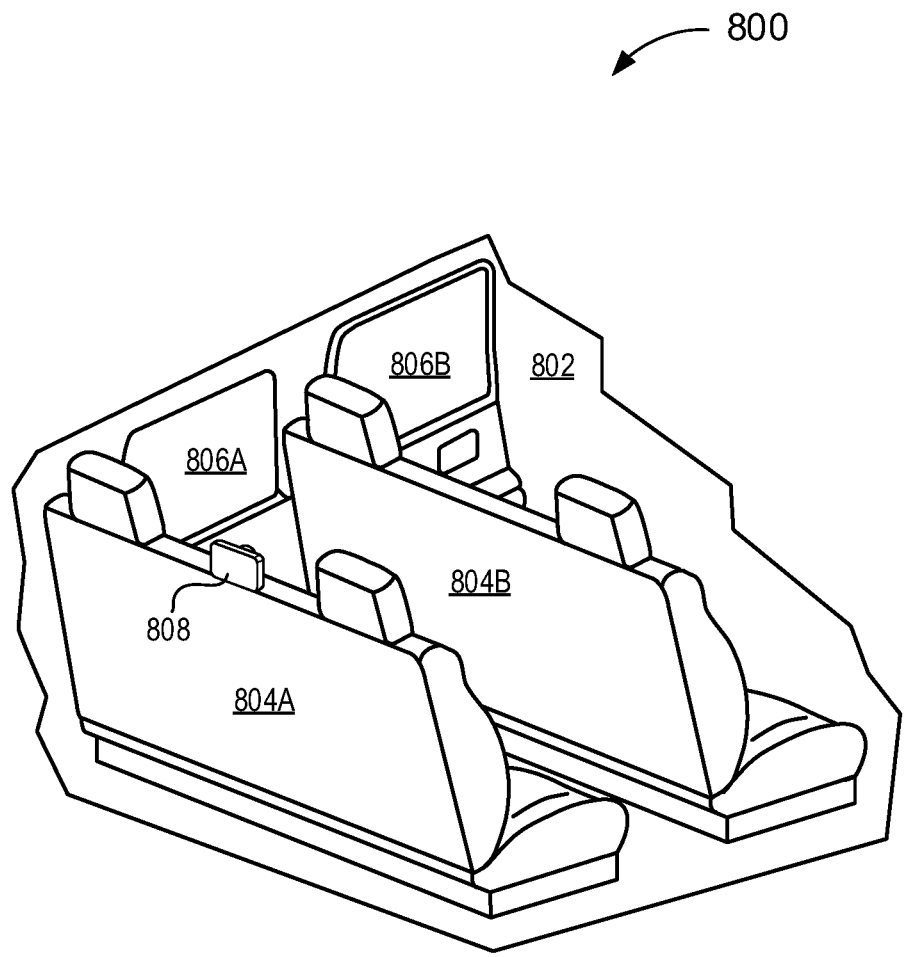
FIGS. 8A-C depict diagrams of a seating compartment of an autonomous vehicle configured to present interactive content on an interior surface of the autonomous vehicle.
Figure 8B:
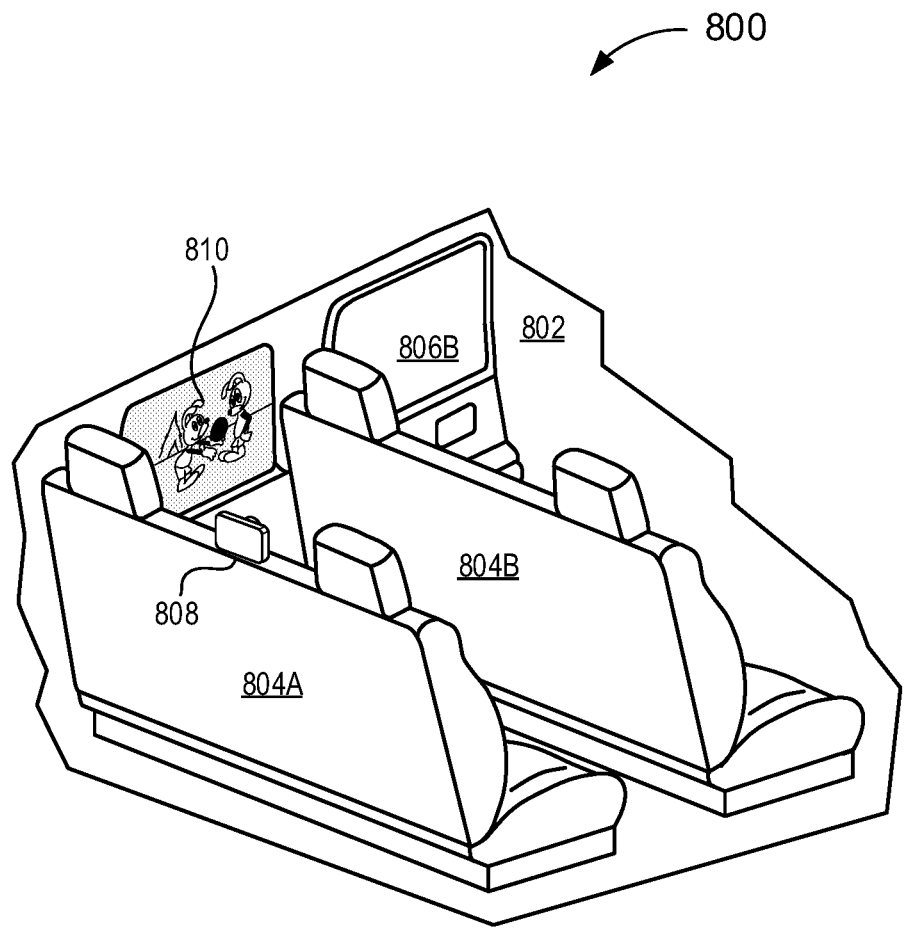
Figure 8C:
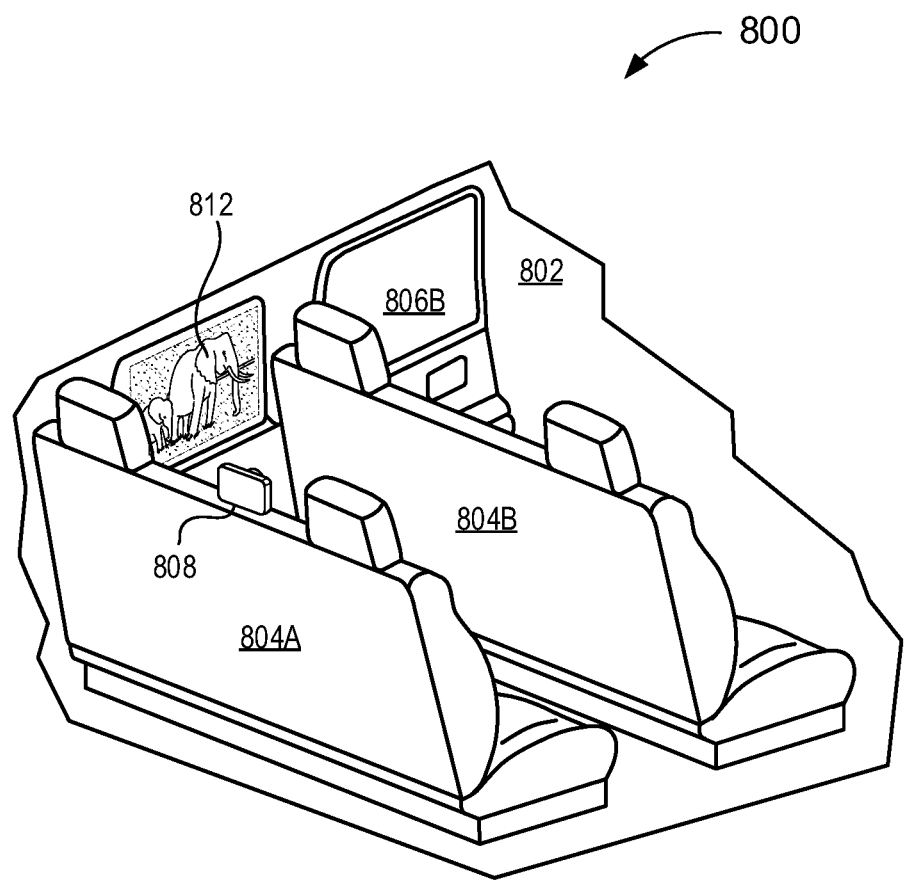

FIGS. 8A-C depict diagrams 800 of a seating compartment 802 of an autonomous vehicle (e.g., autonomous vehicle 102) configured to present interactive content (e.g., interactive content 310) on an interior surface of the autonomous vehicle. The seating compartment includes seats 804A-B, windows 806A-B, and an interactive content projector 808. Although an interactive content projector 808 is shown here, interactive content may be presented otherwise. For example, the one or more of the windows 806A-B may comprise an interactive content display device capable of displaying interactive content. For example, the interactive content projector 808 may project the interactive content 810-812 onto window 806A (FIG. 8B). In some embodiments, the interactive content projector 808 may project multi-layered images onto window 806A (FIG. 8B-C) and/or the windows 806A-B may be capable of displaying multi-layered images. The multi-layered images may be presented/displayed/projected such that they appear as, and/or simulate, virtual reality, augmented reality, and/or the like. As discussed elsewhere herein, the interactive content may be adjusted, as opposed to being static and/or fixed. For example, the interactive content may be rotated as the autonomous vehicle turns. In another example, the interactive content may be adjusted in response to exterior conditions (e.g., terrain, time of day, etc.).

FIG. 9 depicts a diagram 900 of a seating compartment 902 of an autonomous vehicle (e.g., autonomous vehicle 102) configured to detect user behavior within the autonomous vehicle. The seating compartment 902 includes smart seats 902A-B. In the example of FIG. 9, the smart seats 902A-B each include tactile-sensitive surface material 904A-B covering the exterior of the seats 902A-B, and other sensors 906A-B, 908A-B, and 910A-B. An additional other sensor 912 is disposed on a floor of the autonomous vehicle.

FIG. 10 depicts a diagram 1000 of a seating compartment 1002 of an autonomous vehicle (e.g., autonomous vehicle 102) configured to detect user behavior within the autonomous vehicle and present interactive content (e.g., interactive content 310) on an interior surface of the autonomous vehicle. In the example of FIG. 10, the seating compartment includes smart seats 1002A-B including tactile-sensitive surface material 1004A-B and other sensors 1006A-B, 1008A-B, and 1010A-B. An additional other sensor 1012 is disposed on a floor of the autonomous vehicle. An interactive content projector 1014 is mounted within the seating compartment projecting interactive content 1016 onto a window 1018 of the autonomous vehicle. The window 1018 may be curved to facilitate presentation of the interactive content 1016.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
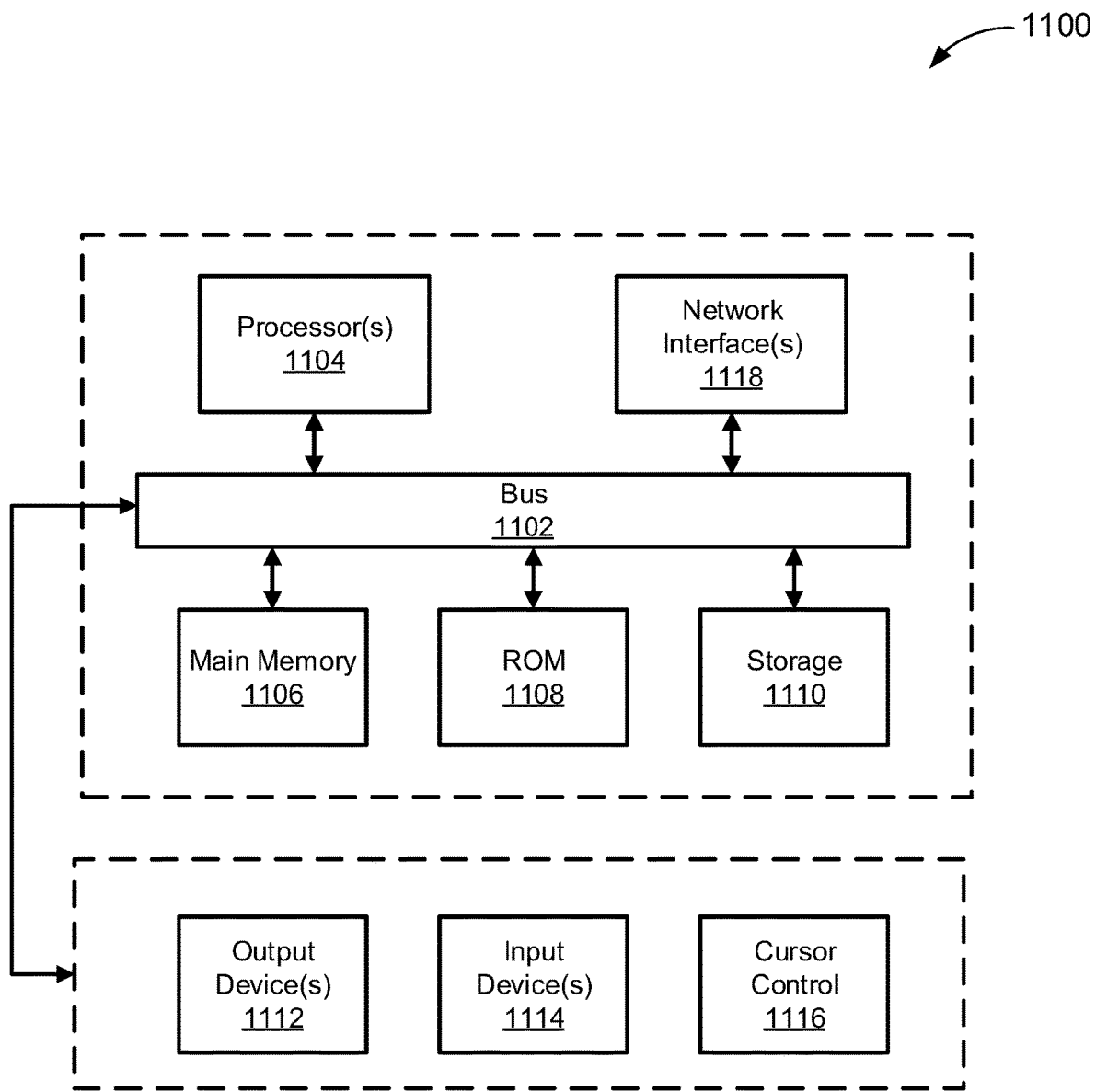
FIG. 11 is a diagram of an example computer system for implementing the features disclosed herein.

FIG. 11 is a block diagram that illustrates a computer system 1100 upon which any of the embodiments described herein may be implemented. The computer system 1100 includes a bus 1102 or other communication mechanism for communicating information, one or more hardware processors 1104 coupled with bus 1102 for processing information.

Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to output device(s) 1112, such as a cathode ray tube (CRT) or LCD display (or touch screen), for displaying information to a computer user. Input device(s) 1114, including alphanumeric and other keys, are coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof Engines, Components, and Logic Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system comprising:
   one or more processors; and
   memory storing instructions that, when executed by the one or more processors, cause the system to perform:
      obtaining smart seat sensor data or other sensor data from one or more other sensors disposed within a vehicle;
      estimating a behavior of an occupant based on the smart seat sensor data or the other sensor data; and
      adjusting a characteristic of a presentation of interactive content on a window of the vehicle based on the estimated behavior of the occupant.

2. The system of claim 1, wherein the adjusting of the characteristic comprises rotating the presentation of the interactive content.

3. The system of claim 1, wherein the adjusting of the characteristic comprises adjusting a playback speed of the interactive content.

4. The system of claim 1, wherein the instructions further cause the system to perform:
   predicting a steering action on the vehicle; and the adjusting of the characteristic is further based on the predicted steering action on the vehicle.

5. The system of claim 1, wherein the adjusting of the characteristic is further based on a terrain over which the vehicle traverses.

6. The system of claim 1, wherein the adjusting of the characteristic is based on whether the occupant is estimated to be sleeping.

7. The system of claim 6, wherein the adjusting of the characteristic comprises lowering a brightness of the interactive content in response to estimating that the occupant is sleeping.

8. The system of claim 1, wherein the estimated behavior of the occupant comprises tearing a tactile-sensitive surface material of a smart seat sensor from which the smart seat sensor data is obtained.

9. The system of claim 1, wherein the obtaining comprises obtaining the other sensor data using a smart seat sensor.

10. A method being implemented by a computing system including one or more physical processors and storage media storing machine-readable instructions, the method comprising:
   obtaining smart seat sensor data or other sensor data from one or more other sensors disposed within a vehicle;
   estimating a behavior of an occupant based on the smart seat sensor data or the other sensor data; and
   adjusting a characteristic of a presentation of interactive content on a window of the vehicle based on the estimated behavior of the occupant.

11. The method of claim 10, wherein the adjusting of the characteristic comprises rotating the presentation of the interactive content.

12. The method of claim 10, wherein the adjusting of the characteristic comprises adjusting a playback speed of the interactive content.

13. The method of claim 10, further comprising:
predicting a steering action on the vehicle; and the adjusting of the characteristic is further based on the predicted steering action on the vehicle.

14. The method of claim 10, wherein the adjusting of the characteristic is further based on a terrain over which the vehicle traverses.

15. The method of claim 10, wherein the adjusting of the characteristic is based on whether the occupant is estimated to be sleeping.

16. The method of claim 15, wherein the adjusting of the characteristic comprises lowering a brightness of the interactive content in response to estimating that the occupant is sleeping.

17. The method of claim 10, wherein the estimated behavior of the occupant comprises tearing a tactile-sensitive surface material of a smart seat sensor from which the smart seat sensor data is obtained.

18. The method of claim 10, wherein the obtaining comprises obtaining the other sensor data using a smart seat sensor.

19. A non-transitory computer readable medium comprising instructions that, when executed, cause one or more processors to perform:
obtaining smart seat sensor data or other sensor data from one or more other sensors disposed within a vehicle;
estimating a behavior of an occupant based on the smart seat sensor data or the other sensor data; and
adjusting a characteristic of a presentation of interactive content on a window of the vehicle based on the estimated behavior of the occupant.

20. The non-transitory computer readable medium of claim 19, wherein the adjusting of the characteristic comprises rotating the presentation of the interactive content or adjusting a playback speed of the interactive content.

* * * * *